United States Patent [19]

Neely, Jr.

[11] 4,216,190

[45] Aug. 5, 1980

[54] METHOD FOR MAKING β-FORM ALUMINUM TRIMETAPHOSPHATE

[75] Inventor: James E. Neely, Jr., Butler, Pa.

[73] Assignee: PPG Industries, Inc., Pittsburgh, Pa.

[21] Appl. No.: 973,482

[22] Filed: Dec. 26, 1978

[51] Int. Cl.$^2$ .............................................. C01B 25/36
[52] U.S. Cl. ................................................... 423/314
[58] Field of Search ....................................... 423/314

[56] References Cited

U.S. PATENT DOCUMENTS

| 2,266,486 | 12/1941 | Booth | 423/314 |
| 3,445,257 | 5/1969 | Hloch et al. | |
| 3,943,231 | 3/1976 | Wasel-Nielen | |

FOREIGN PATENT DOCUMENTS 2264475 1/1974 Fed. Rep. of Germany ........... 423/314

Primary Examiner—Wayne A. Langel
Attorney, Agent, or Firm—Donna L. Seidel

[57] ABSTRACT

A method is disclosed for making the β-form of aluminum trimetaphosphate by reacting aluminum dihydrogen phosphate with ammonia and subjecting the reaction product to a single elevated temperature treatment.

7 Claims, No Drawings

METHOD FOR MAKING β-FORM ALUMINUM TRIMETAPHOSPHATE

FIELD OF THE INVENTION

The present invention relates generally to the art of making $Al(PO_3)_3$ and more particularly to the preparation of the B-form of aluminum trimetaphosphate.

THE PRIOR ART

In U.S. Pat. No. 3,445,257, Hlock et al disclose an improved hardener for water glass cements. The hardener is a condensed aluminum phosphate prepared by subjecting acid aluminum orthophosphates consisting of $P_2O_5$ and $Al_2O_3$ in a ratio of 1.1 to 3 to a two stage thermal treatment. The aluminum orthophosphate is prepared by adding alumina to phosphoric acid.

In U.S. Pat. No. 3,943,231, Wasel-Nielen et al disclose a process of spray drying an aluminum orthophosphate solution containing $P_2O_5$ and $Al_2O_3$ in a ratio greater than 1.5 at a temperature greater than 250° C. to effect direct transformation into amorphous condensed aluminum phosphates.

Crystalline condensed aluminum phosphates are described in the literature by D'Yvoire, who identified a cyclic aluminum tetrametaphosphate, the stable A-form of $Al(PO_3)_3$, and four long-chain polyphosphates, the B, C, D and E forms of $Al(PO_3)_3$. According to D'Yvoire, these crystalline condensed aluminum metaphosphates are produced by reacting $P_2O_5$ and $Al_2O_3$ in a molar ratio of 4 to 15 over several hours. Mixtures of aluminum metaphosphates, including both the A and B forms, have been found in available hardeners.

An alternate process for making condensed aluminum phosphates involves reacting soluble linear or cyclic condensed alkali metal polyphosphates with soluble aluminum salts in water.

SUMMARY OF THE INVENTION

The present invention involves the preparation of B-form aluminum trimetaphosphate by the addition of concentrated ammonium hydroxide to a solution of aluminum dihydrogen phosphate, $Al(H_2PO_4)_3$, to effect the formation of a white precipitate which is directly converted to the B-form of aluminum trimetaphosphate, $Al(PO_3)_3$, by a single elevated temperature treatment. The resultant B-form aluminum trimetaphosphate is useful as a hardener in inorganic paint or cement compositions.

DESCRIPTION OF THE PREFERRED EMBODIMENTS

The aluminum dihydrogen phosphate solution of the present invention is preferably a concentrated solution, most preferably an aqueous solution comprising about 50 percent solids. The solution is preferably maintained at ambient temperature. To the solution of aluminum dihydrogen phosphate is added concentrated ammonium hydroxide, preferably a solution comprising about 30 percent $NH_3$, in an amount sufficient to form a white precipitate from the phosphate solution.

The precipitate which results from the combined solutions may comprise both crystalline and amorphous material. The crystalline material may comprise mixtures of ammonium phosphates and ammonium aluminum phosphates. The precipitate is subjected to a single elevated temperature treatment which results in the formation of B-form aluminum trimetaphosphate. The treatment time varies inversely with the treatment temperature. Preferably, the temperature is at least about 500° C. but less than 900° C. with treatment times varying from several hours to several minutes. The precipitate may be dried prior to the heat treatment.

The present invention will be further understood from the description of specific examples which follow.

EXAMPLE I

To 30 grams of a 48 percent solution of aluminum dihydrogen phosphate is added a 60 percent solution of ammonium hydroxide until the pH reaches about 9. The white precipitate formed by the combination of the two solutions is filtered, dried and heated to 540° C. for 2 hours. The product is about 90 percent of the B-form aluminum trimetaphosphate as identified by X-ray diffraction analysis.

EXAMPLE II

The following components are added together in a ball mill.

$Al(H_2PO_4)_3$, 48% solution: 240 grams
$NH_4OH$, 60% solution: 122 milliliters
Water: 130 milliliters The mixture is ground, dried and treated at 650° C. for 1 hour. The product is identified by X-ray diffraction analysis to be about 80 percent of the B-form aluminum trimetaphosphate.

EXAMPLE III

Ammonium hydroxide solution is added to aluminum dihydrogen phosphate solution which is continuously agitated. A damp white precipitate is formed from the combination of the following solutions.

$Al(H_2PO_4)_3$, 50% solution: 430 grams
$NH_4OH$, 60% solution: 160 milliliters The reaction product is treated at 750° C. for 30 minutes resulting in the formation of predominantly the B-form of aluminum trimetaphosphate.

The above examples are offered to illustrate the present invention. Other time-temperature cycles can be used to obtain the B-form of aluminum trimetaphosphate, as well as other concentrations and ratios of reactants. The acid aluminum phosphate may be reacted with ammonia gas rather than a solution. Other metal cations such as chromium, iron and boron may be substituted for aluminum. The scope of the invention is defined by the following claims.

I claim:

1. A method for preparing aluminum trimetaphosphate in the B-form comprising the steps of:
   a. reacting aluminum dihydrogen phosphate with ammonia to form a reaction product; and
   b. heating the reaction product to a sufficient temperature for a sufficient time that the crystal structure of the heat-treated reaction product is predominantly the B-form.

2. A method according to claim 1, wherein the ammonia is in the form of a concentrated solution of ammonium hydroxide which is added to a concentrated solution of aluminum dihydrogen phosphate to form a white precipitate.

3. A method according to claim 2, wherein the precipitate is heated to a temperature of at least about 500° C.

4. A method according to claim 3, wherein the precipitate is heated to a temperature of about 540° C. for a period of about 1 to 2 hours.

5. A method according to claim 3, wherein the precipitate is heated to a temperature of about 650° C. for a period of about 30 to 60 minutes.

6. A method according to claim 3, wherein the precipitate is heated to a temperature of about 750° C. for a period of about 10 to 30 minutes.

7. A method according to claim 1 wherein the ammonia is in the form of a gas which is added to a concentrated solution of aluminum dihydrogen phosphate to form a white precipitate.

* * * * *